United States Patent [19]

Emery

[11] Patent Number: 5,675,872
[45] Date of Patent: Oct. 14, 1997

[54] JAMMING CLEAT

[76] Inventor: Howard Emery, 6 Letty Green, Hertford SG14 2NZ, Great Britain

[21] Appl. No.: 609,872

[22] Filed: Mar. 1, 1996

[30] Foreign Application Priority Data

Mar. 27, 1995 [GB] United Kingdom ............... 9506622.7

[51] Int. Cl.⁶ ................................................... F16G 11/00
[52] U.S. Cl. ......................................... 24/130; 473/539
[58] Field of Search ............................ 24/129 R, 130, 24/712.1; 114/218; 273/73 D; 473/539, 540, 541

[56] References Cited

U.S. PATENT DOCUMENTS

| | | | |
|---|---|---|---|
| 3,265,032 | 8/1966 | Hume | 114/218 |
| 3,715,782 | 2/1973 | Newell. | |
| 3,812,811 | 5/1974 | Rodriguez. | |
| 3,988,810 | 11/1976 | Emery. | |
| 4,084,532 | 4/1978 | Feder. | |
| 4,309,033 | 1/1982 | Parker, Jr. et al. | 273/73 D |
| 4,333,649 | 6/1982 | Vaughn et al. | 273/73 D |
| 4,397,253 | 8/1983 | Uecker et al.. | |
| 4,896,403 | 1/1990 | Vouros. | |
| 4,956,897 | 9/1990 | Speedie. | |
| 5,158,428 | 10/1992 | Gessner et al.. | |

FOREIGN PATENT DOCUMENTS

| | | |
|---|---|---|
| 1010686 | 11/1945 | United Kingdom. |
| 1463362 | 2/1977 | United Kingdom. |
| 2041765 | 9/1980 | United Kingdom. |
| 2046826 | 11/1980 | United Kingdom. |
| 9532030 | 11/1995 | WIPO. |

Primary Examiner—James R. Brittain

[57] ABSTRACT

A jamming cleat having a groove 156 for receiving a flexible elongate element 180, said groove being defined between opposed side walls 158 each of which is provided with a plurality of ridges 170 for gripping such an elongate element received in the groove, said ridges being inclined with respect to a base 162 of the groove in an axial direction of the groove away from an end 172 of said groove base, the ridge of each side wall disposed furthest from said end 172, the rear most ridge, having a distal end 174 disposed further from said groove base 162 than the respective distal end 176, 178 of the other ridges of the respective side wall. The arrangement of the ridges 170 is such that a flexible elongate element inserted therebetween in a generally lateral direction of the groove towards an end 173 of the groove base is first received at least between the rearmost ridges.

26 Claims, 3 Drawing Sheets

JAMMING CLEAT

The invention relates to a jamming cleat and particularly, but not exclusively, to a jamming cleat for use in securing a string of a sports racquet.

A jamming cleat disclosed in GB2046826B is shown in FIGS. 1 and 2. The jamming cleat 10 has a groove 12 for receiving an elongate object such as a rope or cord 14 (not shown in FIG. 1). The groove is defined between opposed side walls 16 connected by a base 18. The side walls 16 are each provided with a plurality of ridges 20 for gripping a rope 14 received therebetween. The ridges 20 are inclined with respect to the base of the groove in the axial direction of the groove away from an end 22 of the groove. In use, a rope 14 under tension is inserted between the ridges in a generally lateral direction of the groove 12 and on release of the applied tensioning force is pulled through the groove due to the inclination of the ridges 20 so as to be drawn towards the groove base where it is jammed tightly in the cleat.

This cleat works extremely well in many applications. However, it has been found that the shorter, or rearmost, ridges 20' disposed to the left (as viewed in FIG. 1) of the respective longest ridges 20" and adjacent the rear end 24 of the groove can be detrimental to the performance of the cleat. When the rope 14 is introduced into the groove in normal use, it is first received between the respective longest ridges 20" of the side walls 16. Often, as the rope is drawn towards the groove base 18 it is not drawn into the shorter ridges 20'. Consequently, the rope 14 tends to pass through the groove at a relatively sharp angle with respect to the groove base (as indicated in phantom lines in FIG. 2) and is thus prevented from being fully drawn into the groove 12. This has two disadvantageous effects: firstly, the rope is not gripped by all of the ridges of the side walls; and secondly, it is not fully gripped by many of the ridges between which it is received since penetration towards the groove base is relatively limited.

It will be appreciated that if a given load on the rope is taken by some rather than all of the ridges of the cleat, the stress on those ridges which take the load is correspondingly higher increasing the likelihood of failure of the cleat. It also results in a localised strain on the rope and therefore a reduction in the maximum loading the rope can withstand.

These problems have been found to be accentuated when the cleat is adapted for use in securing a string of a tennis racquet. For such a use, the cleat must be made relatively small and may have only two to four ridges on each side wall. Furthermore, in such use as will be apparent from FIG. 4 which shows an embodiment of a cleat according to the present invention, the angle of lateral approach of a string to the groove is relatively steep. It has been found when using a cleat having three ridges to secure a string of a tennis racquet that due to the approach angle of the string, the string is first received between the front end ridges and tends not to be gripped by the rearmost ridges and that the string thus gripped tends to break or slip out of the groove. It has also been found that when the string is not gripped by the rearmost ridges of the cleat, the loading the string can withstand can be as much as fifty per cent less than when all of the ridges grip the string.

It is an object of the invention to at least partially overcome the above-described problems.

Accordingly, the invention provides a jamming cleat having a groove for receiving a flexible elongate element, said groove being defined between opposed side walls each of which is provided with a plurality of ridges for gripping such an elongate element received in the groove, said ridges being inclined with respect to a base of the groove in an axial direction of the groove away from an end of said base, the ridge of each side wall disposed furthest from said end having a distal end disposed further from said groove base than the respective distal end of the or each other ridge of the respective side wall.

Each side wall may be provided with at least three ridges, the respective distal ends of said ridges being disposed progressively further from said base the further the respective ridge is disposed from said end of the groove base.

The ridge of each side wall disposed furthest from said end of the groove base has a length greater than the length of the or each other ridge of the respective side wall.

Each side wall may be provided with at least three ridges, the length of the ridges being progressively greater the further the respective ridge is disposed from said end of the groove base.

The ridges of at least one side wall may be arranged such that a line passing through the distal end of each ridge is inclined with respect to said base at an angle in the range 10° through 35°. The line may be inclined with respect to said groove base at an angle in the range 21° through 27° degrees.

The ridges of each side wall may extend substantially to an edge of the respective side wall, said edges defining a mouth of the groove.

The groove may be generally V-shaped in transverse cross-section.

The invention also includes a jamming cleat comprising a base and two side walls extending from said base in opposed relationship, said side walls defining a groove extending in a lengthwise direction of the cleat and each being provided with a plurality of ridges for gripping a flexible elongate element received in the groove, the ridges being inclined with respect to a base of the groove in an axial direction of the groove away from an end of the groove base, the ridge of each side wall disposed furthest from said end having a distal end disposed further from said base of the cleat than the respective distal end of the or each other ridge of the respective side wall.

The ridges of each side wall disposed furthest from said end of the groove base may have a length greater than the length of the or each other ridge of the respective side wall.

The ridges of each side wall may extend substantially to a lengthwise extending edge of the respective side wall, said edges defining a mouth of the groove and being inclined with respect to the base of the cleat away from said end of the groove base.

The ridges may be inclined with respect to said groove base at an angle of substantially 45°.

The ridges of each side wall may be rectilinear and parallel.

The cleat may comprise external projections for gripping a mounting for the cleat.

The cleat may comprise an aperture or apertures arranged to allow the cleat to be secured to a support surface.

The cleat may form an integral part of an article.

The cleat may form an integral part of a sports racquet.

The cleat may be mounted to a sports racquet.

The invention also includes a method of securing a flexible elongate element by means of a jamming cleat, the cleat having a groove for receiving such an elongate element and ridges provided on opposing faces of the groove for gripping such an elongate element received in the groove, the ridges being inclined with respect to a base of the groove in an axial direction of the groove away from an end of said base, the method comprising the step of orientating the cleat such that such an elongate element inserted between said ridges in a generally lateral direction of the groove is first received at least between the respective ridges of each side wall disposed furthest from said end of the groove.

The method may comprise the step of providing the cleat as an integral part of a sports racquet.

The method may comprise the step of positioning the cleat in a mounting means engaged, or engageable, with said sports racquet.

In order that the invention may be well understood, some embodiments thereof, which are given by way of example only, will now be described with reference to the accompanying drawings, in which:

FIG. 1 is a plan view of a prior art jamming cleat;

FIG. 2 section on line II—II of FIG. 1;

Figure 1:
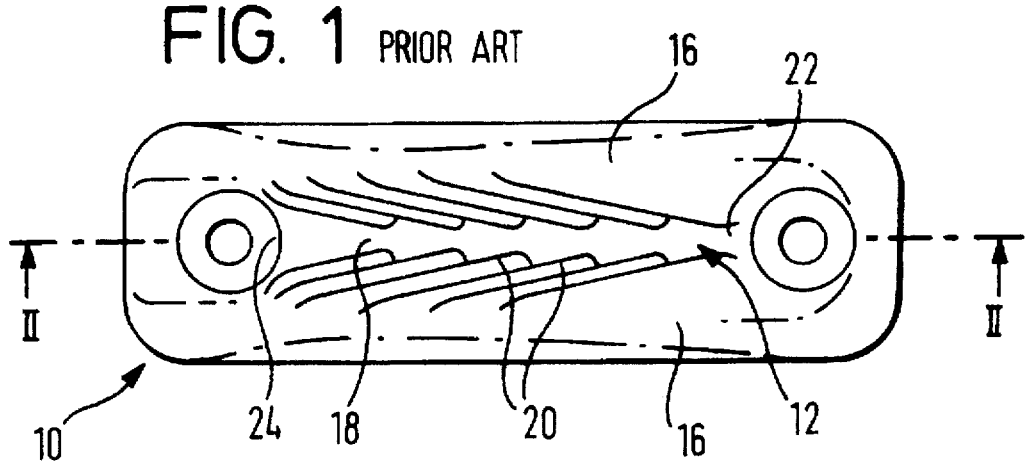
Figure 2:
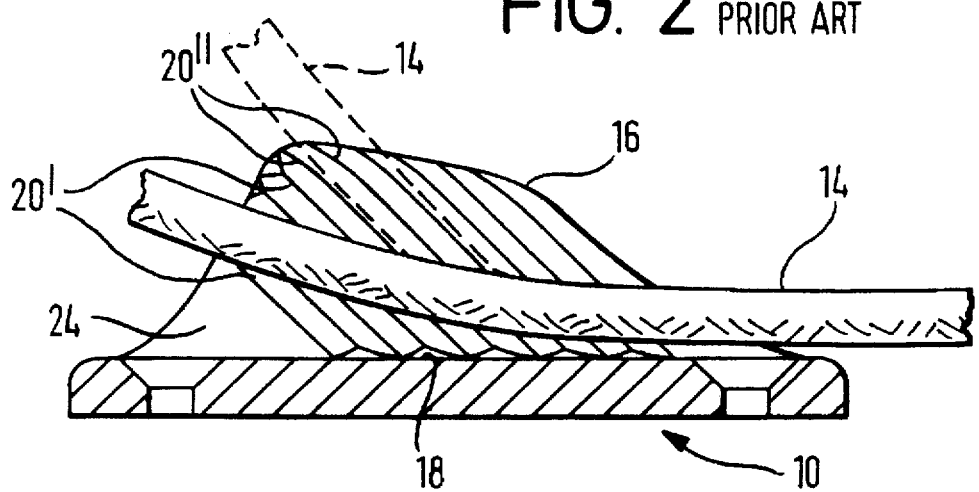
Figure 3:
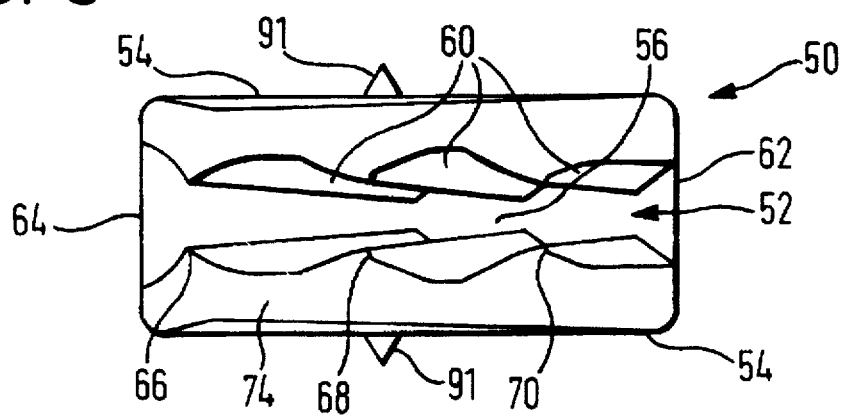
FIG. 3 is a plan view of a first embodiment of a jamming cleat according to the invention.
Figure 4:
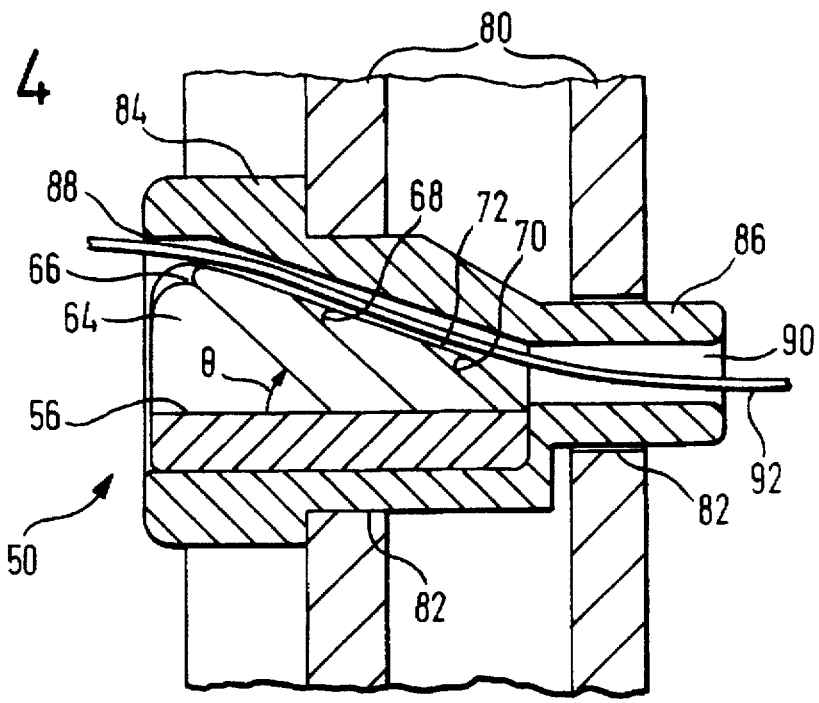
FIG. 4 is a sectional view of the cleat of FIG. 3 mounted in the frame of a tennis racquet for securing a string of the racquet.
Figure 5:
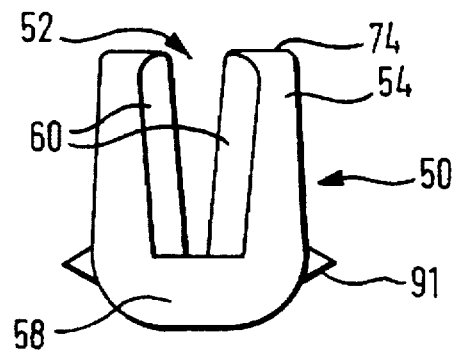
FIG. 5 is an end view of the cleat looking from the left in FIG. 3.

Referring to FIGS. 3 to 5, a first embodiment of a jamming cleat according to the invention is indicated generally at 50. The cleat 50 is particularly suitable for securing a string of a sports racquet as will be described in detail below, although it is not limited to such use.

The cleat 50 is generally U-shaped and has a longitudinally extending groove 52 for receiving a flexible elongate element such as a rope, cord or a string of a sports racquet. In the description which follows, the flexible elongate element will for the sake of convenience be referred to as a string.

The groove 52, which is shown generally V-shaped, is defined between opposed side walls 54 and a surface 56 of a connecting wall 58 which forms the base of the cleat. The surface 56 defines a base of the groove.

The side walls 54 are each provided with three ridges 60 for gripping the string. The ridges 60 are rectilinear and parallel and are inclined with respect to the groove base 56 in an axial direction of the groove away from one, the front, end 62 of the groove base. The angle of inclination θ of the ridges is 45°. Although this is a preferred angle of inclination for the ridges of the cleat 50 when it is to be used for securing a string of a sports racquet, it should not be taken as limiting; the angle θ can be selected to suit the use for which the cleat is intended.

The crests of the ridges 60 on each side wall 54 are disposed substantially in a common plane. These ridge planes converge in the longitudinal direction of the groove from the front end 62 of the groove base towards a rear end 64 thereof. In the embodiment, the angle of convergence is approximately 2.5°. This value should not be taken as limiting and may be within the range of 30' to 8° depending upon the use for which the cleat is intended. The effect of the convergence of the ridge planes is to improve the performance of the cleat and is described in detail in GB 2046826B.

As best indicated by FIG. 4, the ridges 60 of each side wall 54 disposed furthest from the front end 62 of the groove base 56 each have a distal end 66 disposed further from the groove base 56 and from the underside of the base 58 than the distal ends 68, 70 of the other ridges of the respective side wall and have a greater length than those other ridges. The distal ends 68, 70 of the other two ridges 60 of each side wall are disposed progressively further from groove base the further the respective ridge is disposed from the front end 62 of the groove base 56. Also, the length of the other two ridges is progressively greater the further the respective ridge is from the front end 62.

As shown by FIGS. 3 and 4, the ridges 60 of each side wall extend from the groove base 56 substantially to a longitudinally extending edge 72 of the respective side wall 54. The edges 72 define a mouth of the groove through which a string can be inserted into the groove and are in the same plane as a respective upper (as viewed in FIGS. 4 and 5) surface 74 of the side walls. A respective line passing through the distal ends 66, 68, 70, which in the embodiment coincides substantially with the respective edge 72, is inclined at an angle of 21° to the groove base. Although 21° is a preferred angle of inclination for the edges 72 when the cleat is to be used for securing a string of a sports racquet, it is envisaged that the ridges may be arranged such that the angle of inclination of the respective lines/mouth edges is in the range of 10° through 35° according to the use for which the cleat is intended. It is, however, to be understood that this range represents a preferred range and should not be taken as limiting.

It is also to be understood that it is not essential that the ridges 60 extend to the respective upper edges 72 of the groove which edges need not be inclined as illustrated. However, it will be appreciated that it is unnecessary for the side walls to extend upwardly beyond the distal ends 66, 68, 70 of the ridges and by terminating the walls at the distal ends of the ridges, a saving in the weight and overall size of the cleat is obtained. This is particularly advantageous if the cleat is intended for use in a sports racquet, since it is desirable that the weight of the racquet head is kept as low as possible.

It is to be understood that the number of ridges provided on each side wall of the cleat can be varied according to the size of the cleat and the use for which it is intended. Thus for example, if the cleat is to be used for securing a string of a badminton or squash racquet, the cleat may have only two ridges on each side wall.

Use of the cleat 50 for securing a string of a sports racquet will now be described with particular reference to FIG. 4. In this context, a "string" refers to a single span from one side of the racquet head to another, and not to the total length of the string.

FIG. 4 shows a portion of a racquet head frame 80 which is provided with a string hole 82. A mounting means in the form of a grommet 84 is mounted in the string hole 82 and has an annular leading end portion 86 protruding from the string hole inwardly of the racquet head. The grommet 84 is provided with a chamber 88 adapted to receive the cleat 50 with the groove 52 in general alignment with a through-hole 90 in the leading end portion 86. The cleat may be provided with projections 91 for gripping the walls of the chamber 88 when the cleat is inserted therein. The chamber 88 is adapted to provide a clearance above (as viewed in the figure) the cleat to allow an end of a string 92 to be passed through the through-hole 90 and the chamber 88 outwardly of the racquet prior to insertion of the string into the groove 52. It will be appreciated that terminating the upward extent of the side walls 54 along the line of the distal ends of the ridges minimises the longitudinal profile of the cleat thus reducing the required size of the chamber 88 and in turn the size of string hole 82 which must be provided in the racquet head frame.

To secure the end of the string 92 in the cleat 50, the string is inserted between the ridges in a generally lateral direction of the groove by pulling the string downwardly and outwardly of the racquet (as viewed in the figure) so that the string is at least received between the rearmost ridges 60. When the string is released, the ridges 60 grip the string and the tension in the string causes it to slide down into the narrower base region of the groove, guided by the ridges 60, where it is firmly gripped. This downward movement of the string occurs automatically and it is not necessary to push the string downwardly into the groove. It will be appreciated that orientation of the cleat and the arrangement of the ridges is such that despite the relatively sharp angle of approach of the string which in the illustrated embodiment is approximately twenty degrees to the groove base, it will on entering the groove be first received at least in the rearmost ridges. Accordingly, as the string is automatically drawn towards the base region of the groove it is ensured that it will be gripped by all of the ridges 60.

It will be appreciated that the orientation of the cleat and the arrangement of the ridges on each side wall is such that the above-mentioned line passing through the distal ends thereof is at substantially the same angle as the approach angle of the string so that the string having passed between the rearmost ridges, will in relatively quick succession pass between the forward ridges as well. It will be understood that the arrangement of the ridges can readily be modified to match the angle of approach of a string according to any particular use for which the cleat is intended.

Whilst it is envisaged that a sports racquet strung by means of the cleat will have a plurality of strings each spanning the racquet once only and being secured at either end thereof by a respective cleat, it will be appreciated that other arrangements are possible. For example, several strings may be formed by one length of string material which may be tensioned individually by respective pairs of cleats or as a group by a respective cleat at each end of the length of stringing material. It will also be understood that it is not essential for the cleats to be integral with, or mounted to, the racquet head frame. Instead, the cleats may be disposed in the yoke or the handle of the racquet. These latter arrangements may be more appropriate where a group of strings is being tensioned by a single pair of cleats.

Figure 6:
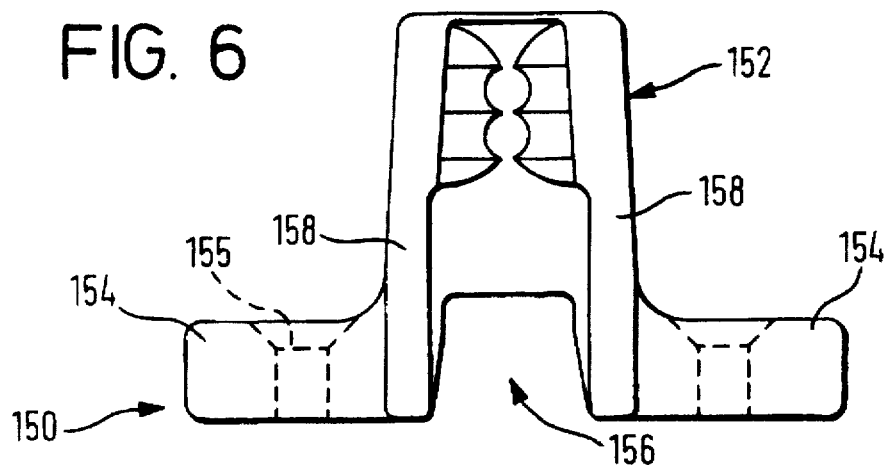
FIG. 6 is an end view of a second embodiment of a jamming cleat according to the invention.
Figure 7:
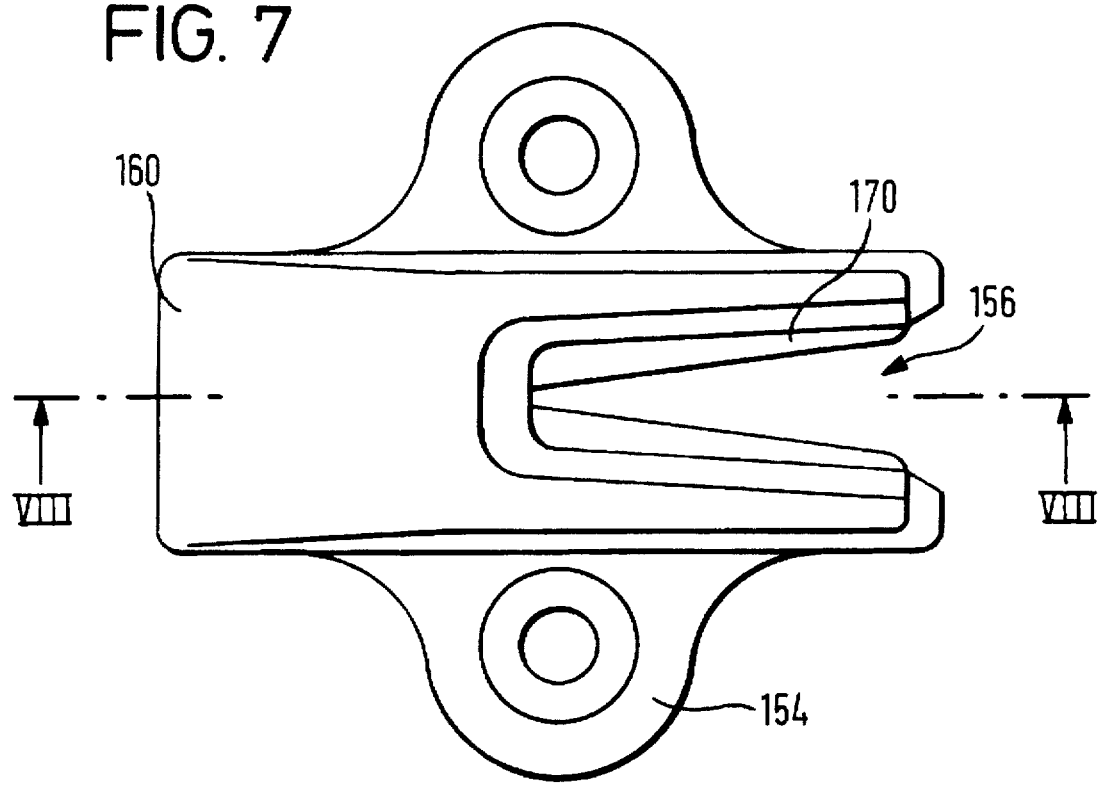
FIG. 7 is a plan view of the cleat of FIG. 6.
Figure 8:
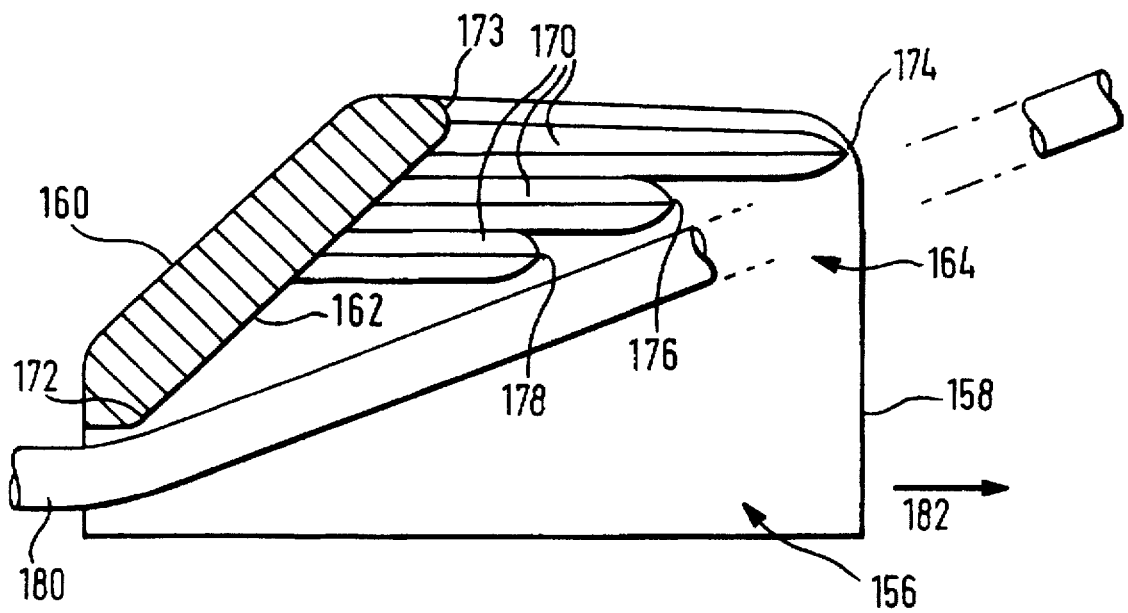
FIG. 8 is a section on line VIII—VIII of FIG. 7.

Referring to FIGS. 6 to 8 a second embodiment of a jamming cleat according to the invention is indicated generally at 150.

The cleat 150 comprises a body portion 152 having feet 154 extending from opposite sides thereof. The feet 154 are provided with countersunk through-holes 155 so that the cleat may be secured to a support surface (not shown) by means of screws or the like.

The body portion 152 has a groove 156 defined between opposed side walls 158 and a connecting wall 160 extending longitudinally of the cleat. An inner surface 162 of the wall 160 defines a groove base. The side walls 158 are adapted such that a portion 164 of the groove which is adjacent the groove base 162 and extends to an upper (as viewed in the figures) surface of the side walls is generally V-shaped.

The side walls 158 are each provided with three ridges 170 which are disposed in the V-shaped portion 164 of the groove. The ridges 170 of each side wall are rectilinear and parallel to one another and to the base of the cleat and are inclined with respect to the groove base 162 in an axial direction of the groove away from a front end 172 of the groove base. As in the first embodiment, the preferred angle of inclination of the ridges to the groove base is 45° although other angles may be used.

Also as with the first embodiment, the crests of the ridges on each side wall are disposed substantially in a common plane and these common planes converge towards the opposite end 173 of the groove base 162.

The ridge of each side wall disposed furthest from the front end 172 of the groove base 162 has a distal end 174 disposed further from the groove base than the respective distal ends 176,178 of the other ridges of the respective side wall and also has a greater length than those other ridges. The distal ends 176,178 of the other two ridges of each side wall are disposed progressively further from the groove base 162 the further the respective ridge is disposed from the front end 172. Also the length of the other two ridges is progressively greater the further the respective ridge is disposed from the front end 172.

In a preferred version this embodiment a respective line passing through the distal ends of the ridges of each side wall is inclined with respect to the groove base at an angle of 27°. A preferred range of angles for this embodiment according to the use for which the cleat is intended, is 20° through 35°.

In use with the cleat secured to a support surface (not shown), a string 180 is passed through the groove 156 in the longitudinal direction thereof indicated by the arrow 182 in FIG. 8. To secure the string the right hand end thereof (as viewed in the figure) is simultaneously pulled in a generally lateral direction of the groove towards the rear end 173 of groove base and in the direction of the arrow 182 so as to be in a state of tension. The arrangement of the ridges is such that as the string bends around the front end 172 of the groove base, the ridges 170 grip the string which when released is automatically drawn to towards the groove base by virtue of the tension therein. The string is firmly gripped in the narrower base region of the groove and will be held there under its own tension.

It will be appreciated that the arrangement of the ridges 170 on each side wall is such that although the string approaches the ridges at an angle it is first received at least between the respective ridges disposed nearest the rear end 173 of the groove base. Accordingly, as the string is automatically drawn towards the base region of the groove, it is ensured that it will be gripped by all of the ridges 170 and in particular the rear end ridges.

The cleats 50 and 150 can be made, for example, by a plastics moulding process such as injection moulding or by pressure die casting. Suitable materials are nylon and aluminium although other materials may be used.

It is to be understood that a cleat according to the invention is not limited to the particular external configurations shown in the figures and may be modified to suit the particular use for which the cleat is intended. The cleat may also be formed as an integral part of an article. Thus for example, the cleat 50 can be formed integrally with the racquet head frame 80.

I claim:

1. A jamming cleat having a groove for receiving a flexible elongate element, said groove being defined between opposed side walls each of which is provided with a plurality of ridges for gripping such an elongate element received in the groove, said ridges being inclined with respect to a base of the groove in an axial direction of the groove away from an end of said groove base, the ridge of each side wall disposed furthest from said end having a distal end disposed further from said groove base than the respective distal end of the or each other ridge of the respective side wall.

2. A cleat as claimed in claim 1, wherein each side wall is provided with at least three ridges, the respective distal ends of said ridges being disposed progressively further from said base the further the respective ridge is disposed from said end of the groove base.

3. A cleat as claimed in claim 1, wherein the ridge of each side wall disposed furthest from said end of the groove base has a length greater than the length of the or each other ridge of the respective side wall.

4. A cleat as claimed in claim 3, wherein each side wall is provided with at least three ridges, the length of the ridges being progressively greater the further the respective ridge is disposed from said end of the groove base.

5. A cleat as claimed in claim 1, wherein the ridges of at least one side wall are arranged such that a line passing through the distal end of each ridge is inclined with respect to said base at an angle in the range 10° through 35°.

6. A cleat as claimed in claim 5, wherein said line is inclined with respect to said groove base at an angle in the range 21° through 27° degrees.

7. A cleat as claimed in claim 1, wherein the ridges of each side wall extend substantially to an edge of the respective side wall, said edges defining a mouth of the groove.

8. A cleat as claimed in claim 1, wherein the groove is generally V-shaped in transverse cross-section.

9. A cleat as claimed in claim 1, further comprising an aperture or apertures arranged to allow the cleat to be secured to a support surface.

10. A cleat as claimed in claim 1, wherein the cleat forms an integral part of an article.

11. A cleat as claimed in claim 10, wherein said article is a sports racquet.

12. A cleat as claimed in claim 1, mounted to a sports racquet.

13. A jamming cleat comprising a base and two side walls extending from said base in opposed relationship, said side walls defining a groove extending in a lengthwise direction of the cleat and each being provided with a plurality of ridges for gripping a flexible elongate element received in the groove, the ridges being inclined with respect to a base of the groove in an axial direction of the groove away from an end of the groove base, the ridge of each side wall disposed furthest from said end having a distal end disposed further from said base of the cleat than the respective distal end of the or each other ridge of the respective side wall.

14. A cleat as claimed in claim 13, wherein the ridges of each side wall disposed furthest from said end of the groove base each have a length greater than the length of the or each other ridge of the respective side wall.

15. A cleat as claimed in claim 13, wherein the ridges of each side wall extend substantially to a lengthwise extending edge of the respective side wall, said edges defining a mouth of the groove and being inclined with respect to the base of the cleat away from said end of the groove base.

16. A cleat as claimed in claim 13, wherein said ridges are inclined with respect to said groove base at an angle of substantially 45°.

17. A cleat as claimed in claim 13, wherein the ridges of each side wall are rectilinear and parallel.

18. A cleat as claimed in claim 13, further comprising external projections for gripping a mounting for the cleat.

19. A cleat as claimed in claim 13, further comprising an aperture or apertures arranged to allow the cleat to be secured to a support surface.

20. A cleat as claimed in claim 13, wherein the cleat forms an integral part of an article.

21. A cleat as claimed in claim 20, wherein said article is a sports racquet.

22. A cleat as claimed in claim 13, mounted to a sports racquet.

23. A method of securing a flexible elongate element by means of a jamming cleat having a groove for receiving such an elongate element, said groove being defined between side walls disposed in fixed relationship and each provided with a plurality of ridges for gripping such an elongate element received in the groove, the ridges being inclined with respect to a base of the groove in an axial direction of the groove away from an end of said base, the method comprising the step of orientating the cleat such that such an elongate element inserted between said ridges in a generally lateral direction of the groove is first received at least between the respective ridges of each side wall disposed furthest from said end of the groove.

24. A method as claimed in claim 23, comprising the step of providing the cleat as an integral part of a sports racquet.

25. A method as claimed in claim 23, comprising the step of mounting the cleat to a sports racquet.

26. A method as claimed in claim 25, comprising the step of positioning the cleat in a mounting means engaged, or engageable, with said sports racquet.

* * * * *